Nov. 15, 1955 K. R. STAUSS ET AL 2,723,850

CARD EJECTOR MECHANISM

Filed Dec. 26, 1952 4 Sheets-Sheet 1

INVENTORS
FRED G. HAMILTON
KARL R. STAUSS
BY Harry T. Berriman
AGENT

Nov. 15, 1955 K. R. STAUSS ET AL 2,723,850

CARD EJECTOR MECHANISM

Filed Dec. 26, 1952 4 Sheets-Sheet 2

INVENTORS
FRED G. HAMILTON
KARL R. STAUSS

BY Harry T. Berriman
AGENT

INVENTORS
FRED G. HAMILTON
KARL R. STAUSS

BY Harry T. Berriman
AGENT

CARD EJECTOR MECHANISM

Filed Dec. 26, 1952

INVENTORS
FRED G. HAMILTON
KARL R. STAUSS

BY Harry T. Berriman
AGENT

United States Patent Office 2,723,850

Patented Nov. 15, 1955

2,723,850

CARD EJECTOR MECHANISM

Karl R. Stauss, Poughkeepsie, and Fred G. Hamilton, Wappingers Falls, N. Y., assignors to International Business Machines Corporation, New York, N. Y., a corporation of New York Application December 26, 1952, Serial No. 328,098

17 Claims. (Cl. 271—65)

This invention relates, to record handling machines and more particularly to a device for automatically ejecting records from a punching machine, tabulating machine or the like, after they have been operated upon.

The present invention relates specifically to an improvement upon the type of ejector shown in the application of Elliot W. Gardinor and Arnold B. Crowell, Serial No. 103,224, filed July 6, 1949, now Patent No. 2,647,581.

The main object of the present invention is to provide an adjustable means for removing cards from a card handling machine so that the arrangement of a group of ejected cards may be predetermined to be either in the same or a reverse order from the order in which they were advanced through the card handling machine.

In the machine disclosed in the application referred to above, the ejected cards are arranged in a group having the same order in which the records were advanced through the machine. In this machine, the records are advanced through the machine successively, face up. After various machine operations are performed on a record, it continues its advance in the initial direction to an eject station. At the eject station the record is advanced, by pusher fingers, at right angles to its initial direction into engagement with the upper circumferential surface of a rotating stacking drum. The record is held to the drum by integral gripper clips or fingers for movement therewith for approximately 90 degrees of rotation of the drum. At this point, the gripper clips release the leading edge of the record which then engages a stationary plate thus tacking the record on edge face outward from the drum. A yieldable member abuts the face of the first record of the group ejected from the machine to maintain the record on edge with its other surface slidably engaging the drum.

Thereafter, the next record is stacked on edge between the previously stacked record and the drum, the yieldable member being accordingly adjusted so as to accommodate two records. This process continues until all of the records are removed from the machine. When the group of stacked records are removed from the machine, the first record fed through the machine will be face up on top of the stack, while the last record of the group will be face up on the bottom of the stack.

In certain further card handling operations utilizing the group of cards operated on by the above mentioned machine, it is necessary that the cards be in reverse order from the order in which they were advanced through this machine. This has necessitated further handling of the records to reverse the order of the group.

The present invention eliminates this further handling of the records by permitting the records advanced through the above machine to be stacked in the conventional or a reverse order, as required by the next operation to be performed on the records. The invention may comprise a mechanism which may be displaced into a cooperating position with the present ejecting mechanism, when desired, to effect a reversal in the normal stacking order of the records.

The reverse stacker mechanism may include projecting spring members which are adapted to bear against the stacker drum so as to prevent the associated gripper clips from gripping the record as its leading edge moves into contact with the drum. The mechanism includes rollers which bear against the stacker drum during the reverse stacking operation. During this operation, the rollers are continuously rotated by the rotation of the drum and in turn effect a circulation of belts operatively linked between each roller and a suitable idler roller.

Each record card is advanced face upward from the eject station as before until the leading edge thereof moves between the top circumferential surface of the stacker drum and the previously mentioned rollers. Thereafter, the movement of the drum and the rollers advances the record, face up, betwen the circulating belts which extend above the path of the record, and a stationary supporting member which extends below the path of the record. After the trailing edge of the record advances out of contact with the drum, a pair of idler rollers maintain the record against the circulating belts to continue the advance of the record.

As movement of the record continues, the upper surface of the leading edge of the record engages and slides along a spring guide until the trailing edge of the record is clear of the previously mentioned stationary guide. The record then drops by gravity, face upward, to a stationary platform. The next record ejected falls, face up, on top of the previously ejected record. This process continues until the entire group of records is removed from the record handling machine. As a result of this ejecting procedure, the first record advanced through the machine is face up on the bottom of the stack and the last record is face up on the top of the stack. Thus, the records are in the desired reverse order.

When the conventional stacking procedure is again desired, it is necessary only to move the reverse stacking mechanism out of engagement with the conventional ejecting mechanism which then functions in its original manner.

Other objects of the invention will be pointed out in the following description and claims and illustrated in the accompanying drawings, which discloses, by way of example, the principal of the invention and the best mode, which has been contemplated, of applying that principle.

Figure 1:
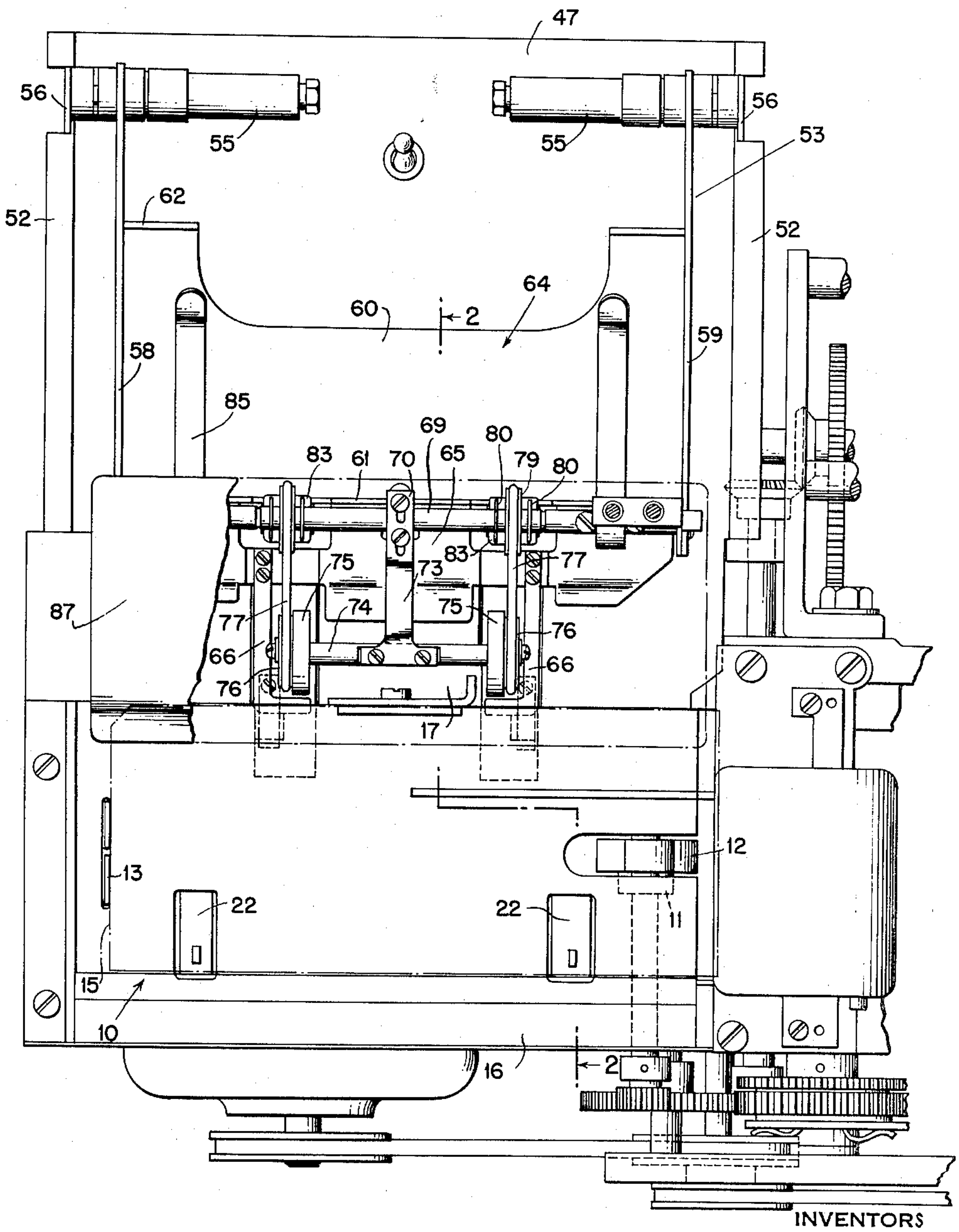
Fig. 1 is a plan view of the record discharge end of a record handling machine with the reverse order stacking mechanism being shown in an operative position coacting with the conventional ejector mechanism, various parts of the reverse order mechanism being broken away to facilitate illustration.

Referring now to Fig. 1, the present invention is shown as applied to the ejector mechanism of the punching machine of Elliot W. Gardinor and Arnold B. Crowell shown in the previously mentioned application, Serial No. 103,224, filed July 6, 1949. Only the ejector mechanism of this machine and such other cooperating parts as required to advance each record successively into the eject station, generally indicated 10, is shown.

Each record of the group to be operated upon by the above machine is advanced in turn, face up through the machine. As the record approaches the eject station, its leading edge advances between a driven roller 11 and an idler roller 12 which continue the advance thereof to the left in Fig. 1 until the left end of the record abuts an upwardly projecting stop 13. Thereafter, the driven roller 11 slips on the record. The record, which is indicated in phantom in Fig. 1 and is designated 15, is now positioned in its so called eject in the eject station 10. It will be noted that the record as it advances into the eject station is guided by a guide member 16 and a card guide lever 17 engaging its forward and rearward edges, respectively, in the direction of its movement. After the record is in the eject position, the roller 12 is raised from the upper surface of the record, as indicated in the timing chart Fig. 5 and by mechanism fully explained in the above application. The release of the card by the roller 12 is effected to permit the record to now be advanced rearwardly, at right angles to its initial movement path. During this latter movement of the record, the card guide lever 17 which is freely mounted on a rod 18 (see Figs. 2 and 4) is rocked out of the path of the advancing record in a manner to be explained. This rearward movement of the record is effected as hereinafter explained.

Figure 3:
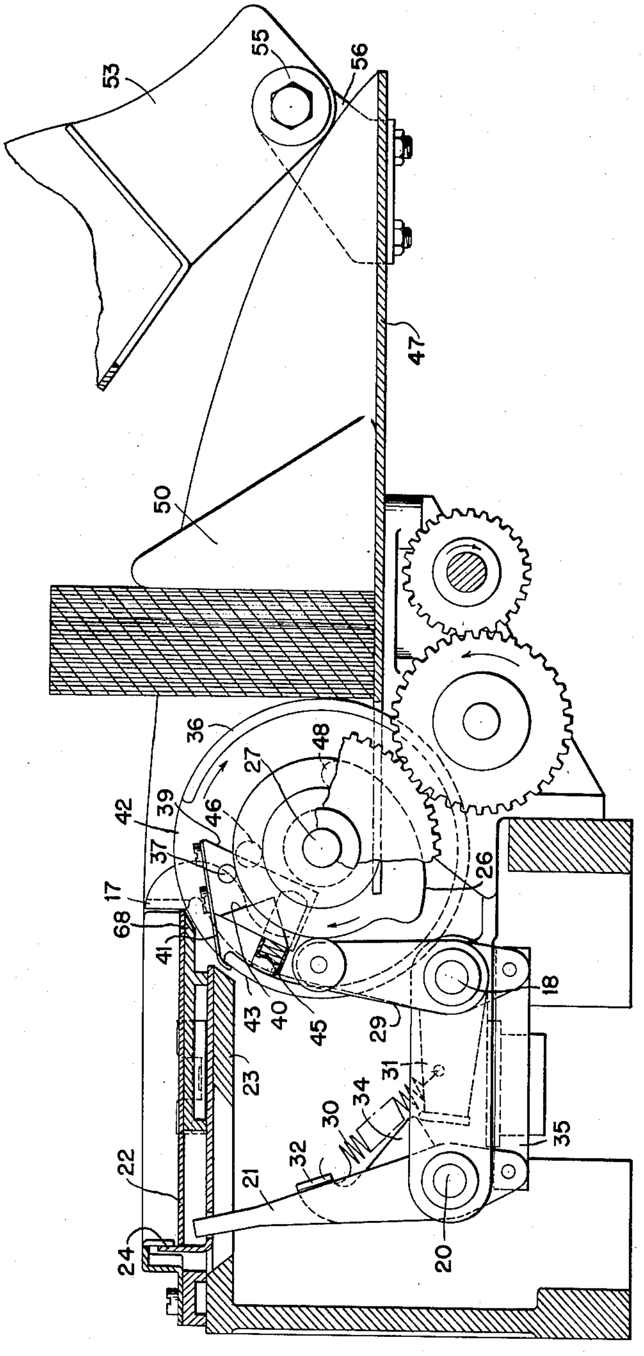
Fig. 3 is a vertical section view taken on the plane of the line 2—2 of Fig. 1 with the reverse order stacking mechanism being shown disengaged from the conventional ejector mechanism, the latter being shown in one of its operative positions.
Figure 4:
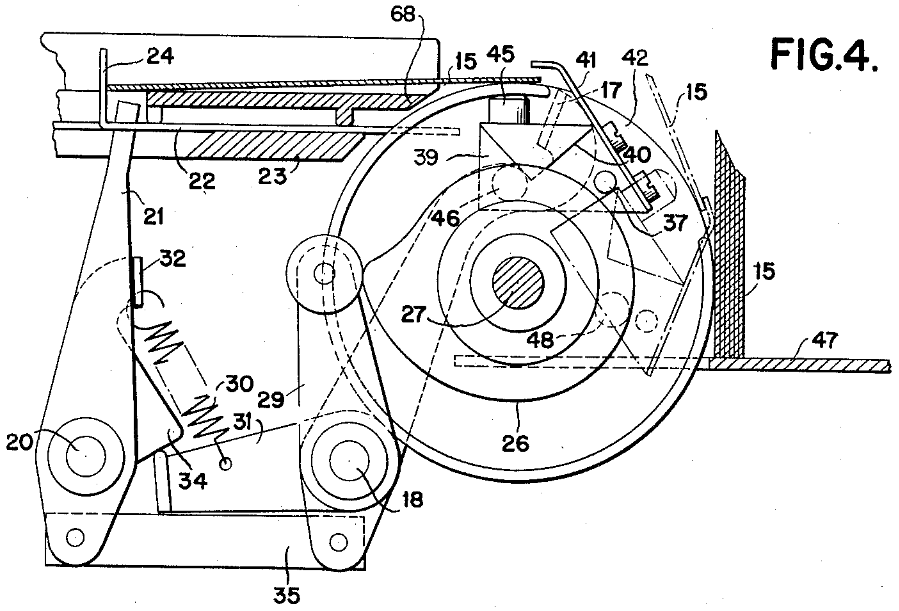
Fig. 4 is an operation view of the mechanism shown in Fig. 3 with the conventional ejector mechanism being shown in another one of its operative positions.
Figure 5:
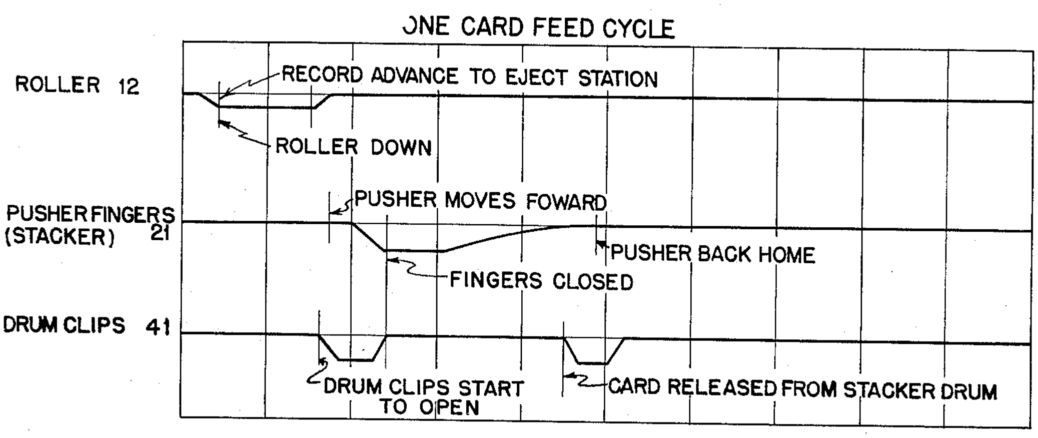
Fig. 5 is a mechanical timing chart.

Referring now to Figs. 3 and 4, it is noted that secured to a rotatably mounted shaft 20 is a pair of pusher fingers 21. The upper ends of these fingers extend into suitable openings in a pair of slides 22 which are reciprocably guided in suitable slots in the stationary frame 23. Each of the slides 22 has an upwardly extending portion 24 lying to the left of the record card in the eject station as viewed in Fig. 3. Each card feed cycle after the roller 12 is free of the upper surface of the record, the shaft 20 rocks clockwise in Fig. 3 (see Fig. 5). This motion of the shaft 20 rocks the pusher arms into the position indicated in Fig. 4 and the resultant movement of the associated slides 22 advances the record laterally from the eject station as indicated. Accompanying this movement, the card guide lever 17 is rocked out of the path of the advancing record as previously stated.

For rocking the pusher fingers 21, there is provided a cam 26 secured to a rotatably mounted shaft 27 which is driven through mechanism fully explained in the above application so as to make one revolution for each card feed cycle. A follower arm 29 secured to the shaft 18 operatively engages the cam 26. A spring 30 connected between an arm 31, also secured to the shaft 18, and a member 32 secured to the shaft 20, continuously urges the shaft 18 clockwise in Fig. 3 so as to maintain the follower arm 29 engaging the cam 26 at all times. It will be noted that a projecting portion 34 of the member 32 operatively engages the end of the arm 31. As the follower arm 29 and associated shaft 18 rock counterclockwise from the position indicated in Fig. 3 to the position indicated in Fig. 4, the arm 31 is accordingly rocked counterclockwise. This movement of the arm 31 permits the member 32 and associated shaft 20 to rock clockwise into the position indicated in Fig. 4 to effect an operational movement of the related pusher fingers 21.

For rocking the guide lever 17 there is provided a link 35 which extends between the lower ends of fingers 21 and lever 17 so that as the fingers shift from the position of Fig. 3 to that of Fig. 4, the lever is rocked clockwise on the shaft 18 so that its upper end is below the path of the advancing card.

To the right of the card in Fig. 3 and secured to shaft 27 for rotation therewith is a stacker drum 36. Pivotally mounted on the drum 36 at a point such as 37 in Fig. 3 are a pair of spaced members 39, each having a triangular shaped cam surface 40. A card clip or finger 41 is secured to each of the members 39 and projects through opening 42 to the outer surface 43 of the drum as indicated. A spring 45 bearing between the drum 36 and each member 39 normally maintains each clip 41 engaging the drum surface 43 as indicated in Fig. 3.

As the drum and associated clips 41 move from their full line position in Fig. 3 to the full position in Fig. 4, the cam surfaces 40 thereon strike a related fixed pin 46 which open the clips as shown in Fig. 4 so that the leading edge of the record being advanced from the eject station 10 enters between the drum and clips as indicated. Thereafter, the clips ride from the fixed pins 46 and close on the edge of the record to carry it with the drum for 90 degrees of rotation of the latter. The manner in which the record 15 is carried with the drum 36 is indicated in dotted line form in Fig. 4. As the leading edge of the card approaches a platform 41, each of the cam surfaces 40 engage a related fixed pin 48 which accordingly actuates the clips 41 to release the leading edge of the record so that it engages the platform 47. After the completion of the revolution of the shaft 27, the various parts are again in their normal position as indicated in Fig. 3 and ready for the next card eject operation. A card weight 50 (see Fig. 3) is slidably mounted on the platform 47 and maintains the first ejected record of the group on edge on the platform with the face of the record engaging the weight and the other surface of the record slidably engaging the drum 37. Although the platform 47 is horizontal in jigs 2, 3 and 4, the entire mechanism is actually arranged in the card handling machine so that the platform (and also the eject station 10) are inclined upward toward the right at an angle of 45° above the horizontal. Consequently as the next record 15 stacked on edge between the drum and the previously stacked record the card weight is accordingly displaced up the inclined platform to provide the required platform space for the record. This action continues until all the records of the group are stacked on edge on the platform. If the stack of records is then removed from the platform and the stack is turned face up, the first record advanced through the machine will be face up on the top of the stack, and the last record advanced through the machine will be face up on the bottom of the stack. Thus, the records have been stacked in the same order in which they were advanced through the machine.

Figure 2:
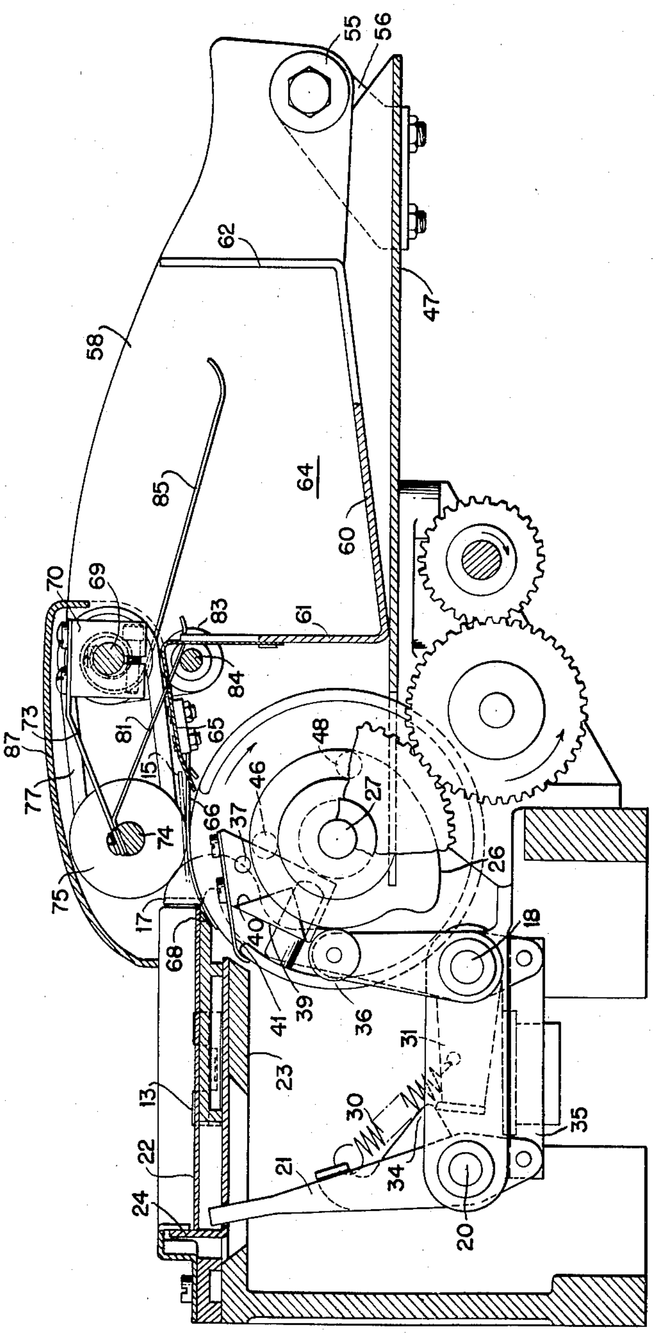
Fig. 2 is a partial vertical section view taken on the plane of the line 2—2 of Fig. 1.

All of the above described ejector mechanism is identical to that shown in the previously mentioned application Serial No. 103,224. If reverse order stacking of a group of records is desired, the mechanism of the present invention is brought into operation. This mechanism is carried on a frame 53 which is pivotally attached by fastenings 55 to brackets 56 secured to the rearward end of the platform 41. The fastenings include spring urged latching members (not shown) which serve to maintain the frame and its associated mechanism in either its inoperative position as indicated in Fig. 3, or in its operative position as indicated in Figs. 1 and 2, as desired by the machine operator. When reverse order stacking is desired, the card weight is removed from the platform 47. In addition, any records which were stacked on edge on the platform 47 as a result of previous conventional stacking operations must be removed. Thereafter, the frame 53 is rotated by hand pressure counterclockwise in Fig. 3 from its inoperative position indicated in Fig. 2.

The frame 53 consists of side members 58 and 59 and an integral bottom member 60 extending therebetween. The bottom member 60 includes upwardly extending forward and rearward walls 61 and 62 respectively, the area enclosed by the side members 58 and 59, bottom member 60, and front and rear walls 61 and 62 serving as a record stacker box and generally designated 64.

Rigidly secured to the outside of the forward wall 62 is a record guide plate 65 which extends towards the stacker drum 36 as indicated in Figs. 1 and 2 when the frame 53 is in the operative position indicated. Secured to the guide plate 65 and projecting outwardly therefrom is a pair of spring members 66, each of which is aligned with a related one of the clips 41 carried by the drum 36. As the frame 53 is rotated into the position indicated in Fig. 2, the operator guides the projecting end of each of the spring members 66 so that it slides underneath the edge 68 of the frame 23 and into the position shown. The purpose of each of these spring members will be later evident.

Extending between the side members 58 and 59 and rigidly secured thereto is a shaft 69 which has a block 70 secured thereto at its midpoint. Secured to the block 70 by fastenings 71 is a semi-flexible member 73 which extends towards the stacker drum as indicated. Secured to the outer end of the member 73 is a shaft 74 which extends parallel to the axis of rotation of the drum 36. Rotatably mounted on each end of the shaft 74 is a roller 75 having a pulley 76 secured thereto by which it is operatively linked by a belt 77 with a related pulley wheel 79 rotatably mounted on shaft 69. Clips 80 carried by the shaft 69 and positioned adjacent to each pulley 79, limit lateral movement of the pulleys thereon. The drum contains a pair of annular rubber inserts (not shown) around its circumferential surface, each insert being normally engaged by the related roller 75 so as to provide a frictional driving connection therebetween.

As each record is advanced from the eject station 10 by the fingers 21, the leading edge thereof engages the drum as before and the pair of clips 41 adjacent thereto open as before to receive the leading edge of the record. The opening action of each of the spring clips, however, only deflects the related spring member 66 upward slightly at the point of contact therebetween so that as the leading edge of the record reaches the point where it would normally pass underneath the ends of the "open" clips, it merely bends upward at each of these points and is deflected over the top of the clips and spring members 66. As the record passes between the rollers 75 and the drum 36, the rollers maintain the record in contact with the drum except at those areas where the record is bent away from the drum by the deflected spring members 66. Further clockwise rotation of the drum 36 advances the record over the record guide plate 65. It will be appreciated that as the record is advanced by the drum, the rollers 75 are rotated by the record. The resultant rotation of the associated belts 77 tends to assist in the advance of the record over the record guide plate 65.

As the record passes over the guide plate, the leading edge thereof engages and deflects upwardly a spring guide 81 which is secured at one end to the midpoint of the shaft 74 and extends downwardly therefrom as indicated in Fig. 2. The guide 81 thereafter rides on the top surface of the record and prevents the midportion thereof from bulging upward between the belts 77.

As the trailing edge of the record advances out of engagement with the drum 36 and rollers 75, the rollers reengage the rotating drum and are driven thereby so that circulation of the belts 77 continues. As the trailing edge of the record advances out of contact with the drum and rollers, its leading edge portion has already passed over pressure rollers 83 rotatably mounted on a shaft 84 which is rigidly secured at its ends to the side walls 58 and 59. The rollers 83 force the record against the circulating belts 77 so that the record continues to advance over the plate 65 by the circulating action of the belts.

As the leading edge of the record passes beyond the plate 65 and rollers 83, it engages and slides along the underside of a pair of spring guide members 85 which are secured at their one end to the shaft 69. As the trailing edge of the record moves beyond the rollers 83 and plate 65, the record then falls face up to the bottom of the stacker box. The next record ejected falls, face up, on top of the previously ejected record. This process continues until the entire group of records is removed from the record handling machine and collected in the stacker box 64. As a result of this ejecting procedure, the first record advanced through the machine is face up on the bottom of the stack and the last ejected record is face up on the top of the stack. Thus the order of the records in the stack is the reverse of the order in which the records were advanced through the record handling machine.

A protective cover 87 extends over the moving parts of the reverse order stacking mechanism to prevent accidental engagement therewith by the machine operator. The cover is pivotally attached to the ends of the shaft 69 and is normally maintained in its protective position by springs connected between it and the shaft. When desired the cover may be pivoted upward to give free access to the mechanism.

When normal order stacking of the ejected records is again desired, the frame 53 is simply rotated from the position indicated in Fig. 2 to the position indicated in Fig. 3, and the card weight 50 is again positioned on the platform 47 adjacent the stacker drum 36.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A mechanism for removing records from a card handling machine in the same or a reverse order from which they are advanced one by one through said machine comprising, in combination, means for advancing each record edgewise, face up, from said card handling machine; a stacking drum extending transversely and below the eject path of said record and engaged by the leading edge of said record, means for rotating said drum, gripper fingers carried by said drum which grip the leading edge of said record thereto for a predetermined angle of rotation of the drum whereafter the record is discharged edgewise therefrom, first collector means for receiving and stacking said record, the subsequently released record being stacked adjacent to and face toward said previously stacked record and accordingly arranged in the same order as ejected from said machine, said first collector means being capable of being disabled, mechanism positionable upon removal of said same order stacked records and disablement of said first collector means, for reversing the stacking order of subsequently ejected records, said mechanism including means for preventing the gripping of the leading edge of an ejected record by said gripper fingers, means engaged coactively with said drum to maintain said non-gripped record frictionally engaged with said drum, wherein said record is advanced thereby; and second collector means for receiving and stacking said record after discharge from said drum and coacting means, the subsequently stacked record being stacked adjacent to and face away from said previously stacked record.

2. A mechanism for removing records from a card handling machine in the same or a reverse order from which they are advanced one at a time through said machine comprising, in combination, a rotating drum, means for ejecting each record edgewise from said card handling machine and into contact with said drum, gripper means associated with said drum for normally gripping the leading edge of said record thereto for a predetermined angle of rotation of the drum whereafter it is discharged edgewise therefrom in some plane different from the original card eject plane, first collector means for receiving and maintaining the discharged record on edge, the subsequently discharged record being received behind said previously discharged record and accordingly arranged in the same order as ejected from said machine, said first collector means being capable of being disabled, mechanism positionable upon removal of said same order stacked records and disablement of said first collector means, for reversing the stacking order of subsequently ejected records, said mechanism including means for preventing the gripping of the leading edge of an ejected record to said drum, an idler roller yieldably engaging said drum at the point of contact of said leading edge of an ejected record with said drum, wherein said rotating drum and idler roller continue the original ejection movement of said record, and second collector means for receiving said record flatwise after discharge from said drum and idler roller, the subsequently ejected record being received flatwise on top of the previously received record.

3. A mechanism for removing records from a card handling machine in the same or a reverse order from which they are advanced one at a time through said machine comprising, in combination, means for ejecting each record face up from said card handling machine, a rotating stacker drum extending transversely to the record eject path and engaged by the leading edge of each record, as ejected, gripper means associated with said drum for gripping the leading edge of said record thereto for a predetermined angle of rotation of the drum whereafter the record is discharged edgewise therefrom, first collector means for receiving and maintaining the discharged record on edge, the subsequently discharged record being received face toward and behind the previously discharged record, said first collector means being capable of being disabled, means positionable after disablement of said first collector means and removal of the associated records, for preventing the gripping of the leading edge of an ejected record to said drum, means concurrently positionable with said last mentioned means, for forcing said record against said rotating drum to continue the face up ejection movement of said record, and second collector means for receiving said record after it is discharged face up from said drum and forcing means, the subsequently ejected record being received face up on top of said record.

4. A mechanism for removing records from a card handling machine in the same or a reverse order from which they are advanced one at a time, face up, through said machine comprising, in combination, means for ejecting each record edgewise from said card handling machine, a rotating stacker drum extending transversely to the record eject path and engaged by the leading edge of each record as ejected, gripper means associated with said drum for gripping the leading edge of each record, as ejected, thereto for a predetermined angle of rotation of the drum whereafter the record is discharged edgewise therefrom, first collector means for receiving said discharged record, the subsequently discharged record being received adjacent to and face toward said previously received record, said first collector being capable of being disabled, mechanism positionable after disablement of said first collector and removal of said associated records for reversing the stacking order of subsequently ejected records, said mechanism including means for preventing the gripping of the leading edge of an ejected record by said gripper means, yieldable roller means engaged coactively with said drum to maintain said non-gripped record frictionally engaged with said drum, wherein said record is advanced thereby in substantially the same plane in which it was ejected from said card handling machine, conveyor means for continuing the advance of said record in said same plane after its trailing edge moves beyond said drum, and second collector means for receiving said record after discharge from said conveyer means, the subsequently discharged record being received adjacent to and face away from said previously received record.

5. The mechanism of claim 4 further characterized in that said conveyor means are driven indirectly by said rotating drum by an operative connection to said roller means.

6. A mechanism for removing records from a card handling machine in the same or a reverse order from which they are advanced one at a time through said machine comprising, in combination, means for ejecting each record, face up, edgewise from said card handling machine in a predetermined plane, a rotating stacker drum extending transversely and below said eject plane said drum being tangentially engaged at its upper circumferential surface by the leading edge of each record, as ejected, gripper means associated with said drum for gripping the leading edge of an ejected record thereto for 90 degrees of rotation of the drum whereafter the record is discharged edgewise therefrom in a plane normal to the original card eject plane, first collector means for collecting the records in a group as they are discharged from said drum, each record being positioned behind and face toward the previously collected record, said first collector being capable of being disabled, mechanism positionable after a disablement of said first collector and removal of said associated records, for reversing the stacking order subsequently ejected records, said mechanism including flexible members preventing the gripping of the leading edge of each ejected record to said drum by said gripper means, yieldable roller means engaged coactively with said drum for maintaining successive portions of each non-gripped record tangentially engaged with said drum, wherein advance of each said record in said predetermined plane is continued, conveyer means for continuing the advance of said record after its trailing edge moves beyond said drum, and second collector means at the discharge end of said conveyer for collecting the records in a vertically extending pile as they are discharged from said conveyer with each record being collected face up on top of the previously collected record.

7. A mechanism for removing records from a card handling machine in the same or reverse order from which they are advanced through a card handling machine comprising, in combination, a rotating cylinder, means for ejecting records, one by one, edgewise from said card handling machine and into engagement with said cylinder, means associated with said cylinder for gripping the leading edge of each ejected record thereto for a predetermined angle of rotation of the cylinder whereafter it is released therefrom, a collector adapted to receive each record edgewise as it is released from the cylinder and maintain said record in said edgewise position, the subsequently released record being stacked behind the previously released record, said collector being capable of being disabled, a mechanism movable into cooperating position with said drum after a disablement of said collector and removal of the associated records to reverse the stacking order of subsequently ejected records, said mechanism including an endless carrier, one end of said carrier yieldably and frictionally engaging said cylinder when said mechanism is in said cooperating position, a card receptacle arranged below the discharge end of said carrier, means disabling said record gripping means of said cylinder wherein said cylinder serves only as a driven roller to advance the leading edge of each ejected record between said cylinder and said endless carrier, the carrier then being driven by the advancing record, record advancing movement of said carrier being continued after the trailing edge of the record is advanced past the point of contact of said cylinder and carrier by the reingagement of said one end of the carrier with said rotating cylinder, said record finally being discharged from said carrier whereafter it falls flatwise to the bottom of said card receptacle with the subsequently ejected record falling on top thereof.

8. The mechanism of claim 7 further characterized by means for continuously holding said ejected record in contact with said endless carrier until it has passed completely beyond said carrier.

9. A mechanism for removing records from a card handling machine in the same or reverse order from which they are advanced through the machine, comprising, in combination, a stacking drum, means for ejecting records, one by one, edgewise from said card handling machine and into engagement with said drum, means associated with said drum for gripping the leading edge of each record as it is fed thereto by said ejecting means, means for rotating each ejected drum wherein said record is carried therewith, means for releasing said gripping means when the leading edge of a gripped record is in a predetermined position, a collector adapted to receive each record edgewise as it is released from the drum and maintain the record in said edgewise position, the subsequently received record card being stacked behind the previously received record so that said cards are stacked on edge in the same order as they are advanced through said machine said collector being capable of being disabled, a mechanism movable into cooperating position with said drum after a disablement of said collector and removal of the associated records to reverse the stacking order of subsequently ejected records, said mechanism including an endless carrier, one end of said carrier yieldably and frictionally engaging said drum when said mechanism is in said cooperating position, a record guide frame extending parallel with and below said endless carrier, rollers carried by said guide frame for cooperation with said endless carrier, a card receptacle at the discharge end of said guide frame and carrier and having a bottom below said discharge end, means engaging said drum gripping means for preventing gripping of the leading edge of each ejected record thereto wherein said record is advanced between said carrier and said rotating drum and along said guide frame, record advancing movement of said carrier being effected after the trailing edge of the record is advanced past the point of contact of said drum and carrier by the reengagement of the one end of said carrier with said rotating drum, said rollers on the guide frame operationally maintaining the record in contact with the moving carrier to continue the advance of the record until it is discharged from said guide frame and carrier, whereafter it falls flatwise to the bottom of said card receptacle with the subsequently ejected record falling on top thereof.

10. A mechanism for removing records from a card handling machine in the same or a reverse order from which they are advanced one by one through said machine comprising, in combination, means for ejecting each record edgewise from said card handling machine, a rotating stacker drum extending transversely to the record eject path and engaged by the leading edge of each record, as ejected, gripper means associated with said drum for gripping the leading edge of each ejected record thereto for a predetermined angle of rotation of the drum whereafter it is discharged edgewise therefrom, first collector means for receiving each discharged record, the subsequently discharged record being received adjacent to and face toward the previously received record, said first collector being capable of being disabled, a mechanism movable into cooperating position with said drum after a disablement of said first collector and a removal of the associated records, to reverse the stacking order of subsequently ejected records, said mechanism including a plurality of endless feeding belts, extending in a common plane, front and rear pulleys supporting the receiving and discharge ends of said belts, a driving connection between one pulley of each of said belts and said drum wherein rotation of said drum effects a circulation of said belts, a feed table extending parallel to and spaced from said feeding belts, flexible spring members engaging said drum for preventing operation of said gripper means wherein each ejected record is advanced by said drum between said feeding belts and said feed table, roller means carried by said feed table for preventing relative movement between a record and said moving feed belts, and second collector means for receiving the records face up in a vertically extending pile after discharge from said table and feed belts.

11. A mechanism for removing records from a card handling machine in the same or the reverse order from which they are advanced one at a time through said machine comprising, in combination, means for advancing a record in a straight line, guide rails for engaging the opposite edges of the record in the direction of its movement, means for moving the record in a direction at right angles to its initial direction, means coordinated with said moving means for moving one of the guide rails out of the path of the record to enable said right angled movement, a stacker drum extending across and below said right angled movement path and engaged by the leading edge of the record, means gripping the leading edge of the record to said drum as the drum is engaged by the leading edge thereof, means for rotating said drum wherein said record is carried therewith, means for releasing said gripping means when the leading edge of the record is in a predetermined position, a collector adapted to receive the record edgewise as it is released from the drum and maintain the record in said edgewise position, a subsequent record being stacked behind the previously received record so that the records are stacked on edge in the same order as they were advanced through said machine, said collector being capable of being disabled, a mechanism movable into cooperating position with said drum after a disablement of said collector and a removal of the associated records to reverse the stacking order of subsequent records, said mechanism including an endless carrier, one end of said carrier frictionally engaging said drum when said mechanism is in said cooperating position, said carrier extending above said right angled movement path of a record; a stationary record guide frame extending below said right angled record movement path, rollers carried by said guide frame for cooperation with a lower course of said endless carrier, a card receptacle at the discharge end of said guide frame and carrier and having a bottom below said discharge end, means engaging said gripping means for preventing gripping of the leading edge of a record thereto wherein said record is advanced between said carrier and said rotating drum and along said guide frame, record advancing movement of said carrier being effected after the trailing edge of the record is advanced past the point of contact of said drum and carrier by the reengagement of the one end of said carrier with said rotating drum, said rollers in the guide member then maintaining the record in contact with the carrier to continue the advance of the record until it is discharged from said guide frame and carrier, whereafter it falls flatwise to the bottom of said card receptacle with the subsequently discharged record falling on top thereof.

12. A mechanism for removing records from a card handling machine in the same or a reverse order from which they are advanced through the machine comprising, in combination, a frame to which records are advanced face up, one at a time, upon completion of operations thereon by said card handling machine, a pair of pusher fingers reciprocably guided on said frame and adapted to eject each record therefrom in a predetermined plane, means for reciprocating said fingers, a stacker drum disposed said frame, the axis thereof extending transversely to the record eject path and below said path so that the leading edge of each ejected record engages an upper circumferential surface of said drum; means for rotating said stacker drum, gripper clips associated with said drum and automatically actuated so as to grip said leading edge of the ejected record thereto for 90 degrees of rotation of the drum, a platform located below said drum and adapted to receive each record edgewise from said drum upon release of said gripper clips, a record support member movably mounted on said platform and adapted to maintain each released record edgewise on said platform face toward said support member, a subsequently released record being stacked behind the previously released record with the support member being displaced by the increasing record stack as each record is stacked; a mechanism movable into cooperating position with said drum after removal of said record support member and the associated records, to reverse the stacking order of subsequently ejected records, said mechanism including an endless feed belt, front and rear pulleys supporting the receiving and discharge parts of said belt, said belt extending horizontally above and beyond the predetermined eject path of said record from said frame, a roller secured to said receiving end of the belt and yieldably and frictionally engaged with said stacker drum when said mechanism is in its cooperating position wherein rotation of said drum drives said belt, means engaging said gripper clips for preventing the normal gripping action thereof wherein the leading edge of each ejected record is advanced between said drum and said roller, the rotation of said drum continuing the advance of said record in said predetermined plane, means for pressing said record against said belt to prevent relative movement therebetween, and a receptacle having a bottom and a plurality of walls projecting upwardly therefrom, one of said walls being adjacent the discharge end of said belt and having its upper edge lying below the plane of card discharge wherein as said record is discharged from said belt it falls face up to the bottom of said receptacle.

13. A mechanism for removing records from a card handling machine in the same or a reverse order from which they are advanced through said machine comprising, in combination, a frame member, a drum rotatably mounted on said frame member, a plurality of gripper fingers carried by said drum and each normally engaged with a predetermined point on the circumferential surface of said drum, means for rotating said drum, means secured to said stationary frame for momentarily releasing said fingers from gripping engagement with said drum at first and second pre-determined points in each rotation of said drum, wherein an edge of a record may be advanced under said gripper finger and thereafter gripped to said drum at said first predetermined point, said edge of said gripped record being released from said gripper fingers and drum at said second predetermined point with the record accordingly being ejected edgewise from said drum; means coordinated with said drum rotating means for advancing records edgewise, one by one, into contact with said drum at said first predetermined point, collector means for receiving and maintaining each record edgewise as it is ejected from said drum, the subsequently ejected record being received behind said previously ejected record, said collector being capable of being disabled, a mechanism movable into cooperating position with said drum, after a disablement of said collector and a removal of said associated records, said mechanism including a plurality of spring fingers engaging said drum at said first predetermined point for deflecting the leading edge of a record over said momentarily released gripper fingers so as to prevent gripping of said record to said drum, means for forcing said non gripped record against said drum wherein the further rotation of said drum continues the advance of said record, endless conveyor means for continuing the advance of said record after it moves beyond said drum, and means for receiving said record flatwise after discharge from said conveyor means, the subsequently discharged record being received flatwise on top of the previously discharged record.

14. A mechanism for removing records from a card handling machine in the same or a reverse order from which they are advanced one by one through said machine comprising, in combination, means for ejecting each record edgewise, face up, from said card handling machine, a rotatable stacking drum having its axis of rotation extending transversely to the eject path of said record in a plane below and parallel to said path, the upper circumferential surface of said drum being engaged by the leading edge of each record, as ejected, means for rotating said drum, gripper fingers carried by said drum for gripping the leading edge of an ejected record thereto for a predetermined angle of rotation of the drum, whereafter the record is discharged edgewise therefrom; collector means for receiving and stacking each discharged record, the subsequently discharged record being stacked adjacent and face toward said previously stacked record, said collector being capable of being disabled, a mechanism movable into cooperating position with said drum after a disablement of said collector and a removal of the associated stacked records to reverse the stacking order of subsequently ejected records, said mechanism including, a frame having spaced side members and an integral bottom member extending therebetween, said bottom member including upwardly projecting rear and forward walls with the forward wall being adjacent said drum and having its upper edge below and beyond the eject path of a record from said card handling machine; a shaft rigidly secured to and extending between said side walls, a flexible member rigidly secured at one end to said shaft at a point intermediate the ends thereof and extending outwardly therefrom, a shaft secured to the outer end of said flexible member and extending above and parallel to the axis of rotation of said drum, a roller rotatably mounted on each end of said second mentioned shaft and including a pulley secured thereto, the rollers yielding and frictionally engaging the surface of said drum at the point at which the leading edge of each ejected record engages said drum, a pair of idler pulleys rotatably mounted on said first mentioned shaft, one for each of said first mentioned pulleys and in alignment therewith, an endless belt linking the pulley of each said rollers and its related idler pulley, wherein rotation of said drum and in turn said rollers imparts a circulatory motion to said belt; a record guide plate secured to said forward wall and extending outwardly therefrom towards the upper circumferential surface of said drum, said plate extending parallel to and below the lower course of said belts, a pair of flexible spring fingers secured at one end to said plate and extending outwardly therefrom into cooperating position with said drum at its upper circumferential surface to suspend normal operation of said gripper fingers wherein the leading edge of the ejected record advances between said drum and rollers and along said guide plate by the rotation of said drum, the movement of said record over said guide plate being continued after the trailing edge of the record moves beyond said drum by said belts, each roller of which is then driven by said drum, each record finally being advanced beyond said belts and guide frame whereafter it falls flatwise face up into engagement with said bottom member with the subsequently ejected record falling face up on top thereof.

15. The mechanism of claim 14 further characterized by a flexible record guide member secured at one end to said second mentioned shaft and extending downward therefrom between said belts and into the path of advancement of a record over said guide plate in the direction of the card movement, for preventing the portion of said record between said belts from deflecting upward therebetween; and a pair of flexible record guide members secured and one end to said first mentioned shaft and extending outwardly therefrom over said bottom member in the direction of the card movement for guiding the leading edge of said record as it passes beyond said guide plate and said belts.

16. The mechanism of claim 14 further characterized by one or more rollers mounted on said guide plate and projecting into the path of movement of a record thereon for forcing said record into contact with the lower course of said circulating belts to prevent any relative motion therebetween.

17. A mechanism for removing records from a card handling machine in the same or a reverse order from which they are advanced one by one through said machine comprising in combination, means for ejecting each record edgewise, face up, from said card handling machine; a stationary frame, a stacking drum rotatably mounted on said frame and extending transversely and below the eject path of a record and engaged at its upper circumferential surface by the leading edge of said record, means for rotating said drum, gripper fingers carried by said drum for gripping the leading edge of each ejected record thereto for a predetermined angle of rotation of the drum whereafter the record is discharged edgewise therefrom, collector means carried by said frame for collecting the records in a horizontally extending pile as they are discharged from said drum, each record being arranged behind and face toward the previously stacked record, said collector being capable of being disabled, a mechanism moveable into cooperating position with said drum to reverse the stacking order of subsequently ejected records, said mechanism including, a frame, fastening means pivotally connecting said frame at one end to said stationary frame, wherein said frame and associated mechanism may be rotated into either a cooperating or noncooperating position relative to said drum rotation of said frame into said cooperating position being possible only after a disablement of said collector and a removal of the associated collected records, a plurality of endless conveyors extending in a common plane above and beyond the top surface of said drum when said frame is in its cooperating position, a roller carried by the drum end of each said conveyors and yieldably and frictionally engaging said drum wherein rotation of said drum effects circulation of said conveyors, a record table secured to said moveable frame and extending parallel to and spaced from the lower course of said endless conveyors, flexible members extending outwardly from said frame and bearing against said drum for preventing the gripping action of said gripper fingers when said frame is in said cooperating position, wherein each ejected record is directed between said rollers and drum and over said table, roller means carried by said table for pressing said record against the lower course of said conveyor to prevent relative movement therebetween wherein said conveyor continues the advance of the record over said table after its trailing edge moves beyond said drum and conveyor rollers, and a receptacle secured to said moveable frame below a discharge end of said table for collecting the discharged records face up in a pile.

References Cited in the file of this patent

UNITED STATES PATENTS

| | | |
|---|---|---|
| 1,846,324 | Finn | Feb. 23, 1932 |
| 2,631,039 | Barber | Mar. 10, 1953 |